Oct. 28, 1958

A. F. JONES 2,858,371

TELEPHONE SUBSCRIBERS' APPARATUS

Filed June 29, 1954

3 Sheets-Sheet 1

INVENTOR
ARTHUR FREDERICK JONES
BY
ATTORNEY

Oct. 28, 1958

A. F. JONES 2,858,371

TELEPHONE SUBSCRIBERS' APPARATUS

Filed June 29, 1954

3 Sheets-Sheet 2

INVENTOR
ARTHUR FREDERICK JONES
BY
ATTORNEY

INVENTOR
ARTHUR FREDERICK JONES
BY
ATTORNEY

United States Patent Office 2,858,371

Patented Oct. 28, 1958

2,858,371

TELEPHONE SUBSCRIBERS' APPARATUS

Arthur Frederick Jones, Coventry, England, assignor to The General Electric Company Limited, London, England Application June 29, 1954, Serial No. 440,185

Claims priority, application Great Britain July 1, 1953

16 Claims. (Cl. 179—81)

The present invention relates to telephone apparatus of the kind usually referred to as subscribers' apparatus or as telephone sets. The invention is more particularly concerned with such apparatus which is adapted for connection over line wires to a central battery telephone exchange.

One object of the present invention is to provide an improved construction of telephone apparatus including a transistor amplifier.

According to the present invention, telephone apparatus for connection over line wires to a central battery telephone exchange comprises a pair of terminals for connection to line wires, a microphone, a transistor amplifier which is connected in circuit between the microphone and the said pair of terminals, and means for deriving from line current through the apparatus an electric supply to operate said transistor amplifier, the said means including an element which has a non-linear resistance whereby, when the apparatus is connected over line wires to a central battery exchange, the resistance of said element upon line current flowing therethrough has a value such that it tends to stabilize the voltage of said supply over a range of values of loop resistance of the line wires.

Preferably the transistor, or each transistor if there are more than one, of the transistor amplifier is of the junction type. The said element may be a resistor of the type that has a relatively large negative temperature coefficient and is usually known as a thermistor.

Figure 1:
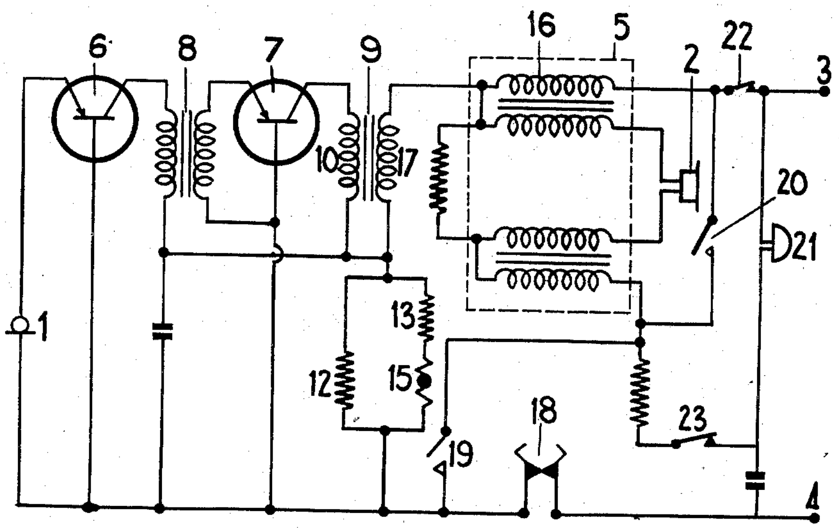
Figure 2:
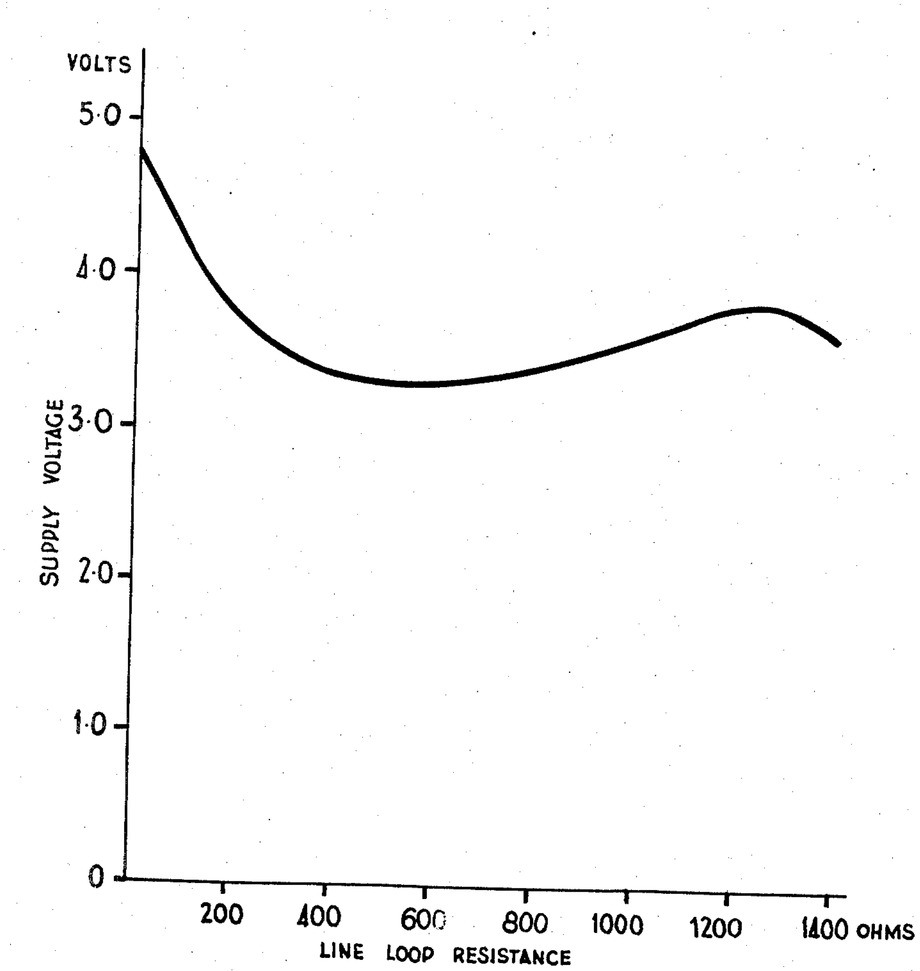

Five circuits of telephone subscribers' apparatus in accordance with the present invention will now be described by way of example with reference to the six figures of the accompanying drawings, in which Figure 1 shows the circuit of the first example, Figure 2 is an explanatory diagram, and Figures 3 to 6 show the circuits of the other four examples respectively.

Referring to Figure 1, the first example of a telephone subscriber's apparatus in accordance with the invention comprises a moving coil microphone 1, a telephone receiver 2, and a pair of terminals 3 and 4, which, during operation of the apparatus, are connected over line wires to a telephone exchange. An induction coil 5 is arranged to provide an anti-side tone circuit in known manner. A transistor amplifier is provided for the purpose of amplifying speech signals supplied by microphone 1 and this amplifier comprises two transistors 6 and 7 that are both p–n–p germanium junction transistors. The transistors 6 and 7 are arranged to operate as grounded-base stages and are coupled to one another by means of a transformer 8 while another transformer 9 has its primary winding 10 connected in the collector circuit of the transistor 7.

The transistors 6 and 7 are arranged to operate with zero emitter-base bias, although the emitter may be positively biased, while the collector-base voltage is derived from a network which consists of resistors 12 and 13 and a thermistor 15, this network being connected in series with the primary winding 16 of the induction coil 5 and the secondary winding 17 of the transformer 9 between the terminals 3 and 4, so that it carries the steady line current supplied by the battery at the exchange. It will be appreciated that the magnitude of this line current depends upon the loop resistance of the line connected between the subscriber's apparatus and the exchange with the result that if a resistor were to be provided in place of the said network, the operating voltages supplied to the transistors 6 and 7 would depend upon the length of line.

In the arrangement being described, however, by suitable choice of the values of the resistors 12 and 13 and of the thermistor 15, it is found that the voltage developed across the network formed by these components varies only over a small range of values for a relatively large range of values of loop resistance of the line wires connected to the terminals 3 and 4. The variation in this voltage is plotted against loop line resistance in Figure 2 for the case where the voltage of the exchange battery is 50 volts while the resistors 12 and 13 have values of 155 ohms and 50 ohms while thermistor 15 has a resistance of 5000 ohms when cold and a hot resistance of 20 ohms, the windings 16 and 17 having a resistance of 30 ohms.

In Figure 1 there are also shown impulsing springs 18 of a telephone dial, dial off-normal contacts 19 and 20, a calling bell 21 and cradle switches 22 and 23.

Figure 3:
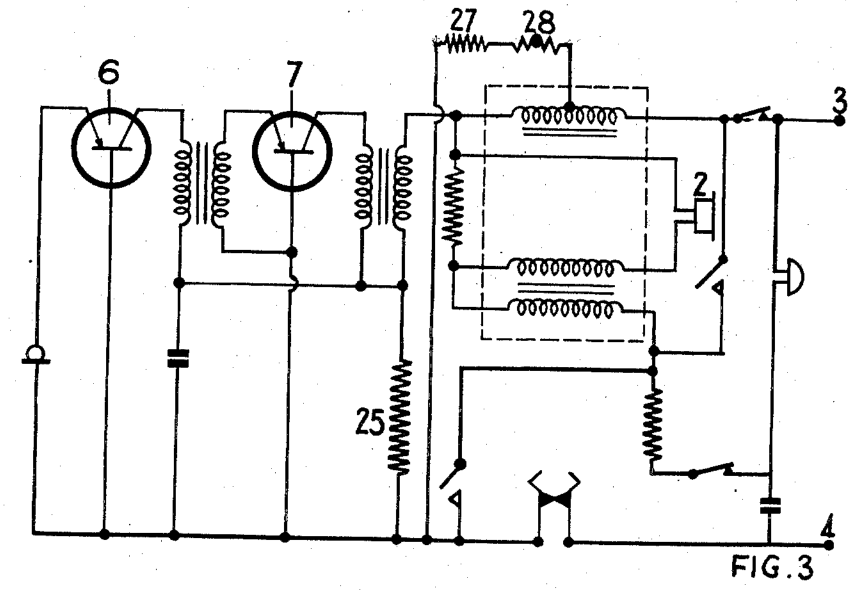

The arrangement shown in Figure 3 is very similar to that described by the reference to Figure 1 except that in this case, the collector-base voltage supplied to the transistors 6 and 7 is developed across a resistor 25 that carries a portion of the steady line current while a network formed by resistors 26 and 27 and a thermistor 28 are connected in a shunt path. This arrangement tends to stabilize the voltage developed across the resistor 25 and make it approximately constant over a range of values of the loop resistance of the line wires connected between the terminals 3 and 4 and the exchange.

When there is a relatively long line between the subscriber's apparatus of Figure 3 and the exchange, the network formed by the resistors 26 and 27 and the thermistor 28 has little shunting effect with the result that this network causes little attenuation of the speech signal supplied by the transistor amplifier to the line wires or of any speech signal received from the line wires before that signal is applied to the receiver 2. When, however, there is a relatively short line between the subscriber's apparatus and the exchange it will be appreciated that due to the relatviely large steady line current the thermistor 28 has a relatively low resistance so that the network formed by the resistors 26 and 27 and the thermistor 28 appreciably attenuates speech signals in both directions.

In this arrangement, the resistors 25 and 27 and the thermistor 28 may have the same values as the corresponding components 12, 13 and 15 in Figure 1.

Figure 4:
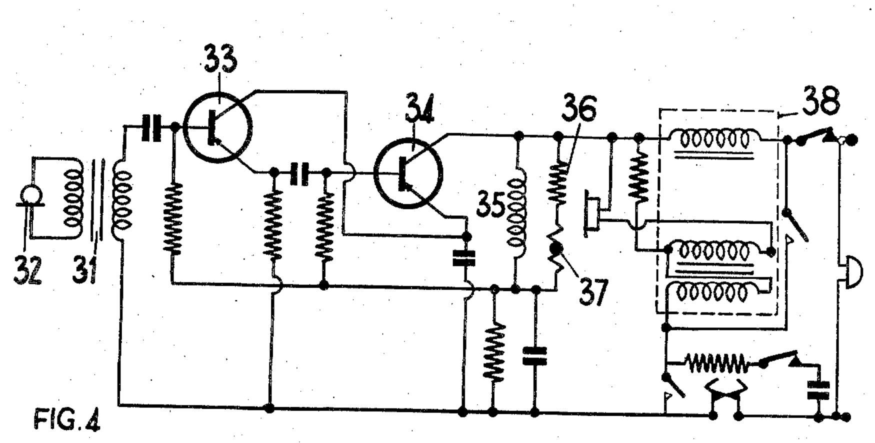

Referring now to Figure 4 which shows the third example of a telephone subscriber's apparatus in accordance with the present invention, this apparatus is somewhat similar to that described by the reference to Figure 1 although a different transistor amplifier is included. In this case the speech signals supplied through the transformer 31 from the microphone 32 are fed through a two stage transistor amplifier, the two stages being resistance-capacity coupled. This amplifier comprises two p-n-p germanium junction transistors 33 and 34, the transistor 33 being arranged to operate as a grounded collector stage while the transistor 34 is arranged to operate as a grounded emitter stage. A stabilized voltage supply for this transistor amplifier is developed across a network which is formed by an inductor 35, a resistor 36 and a thermistor 37, this network carrying the steady line current. By suitably selecting the values of the inductor 35 and the resistor 36, the subscriber's apparatus may be given a rising amplitude/frequency characteristic for out-going speech signals thereby tending to counter-act the relatively poor high frequency transmission characteristics of certain types of underground telephone cables.

Figure 5:
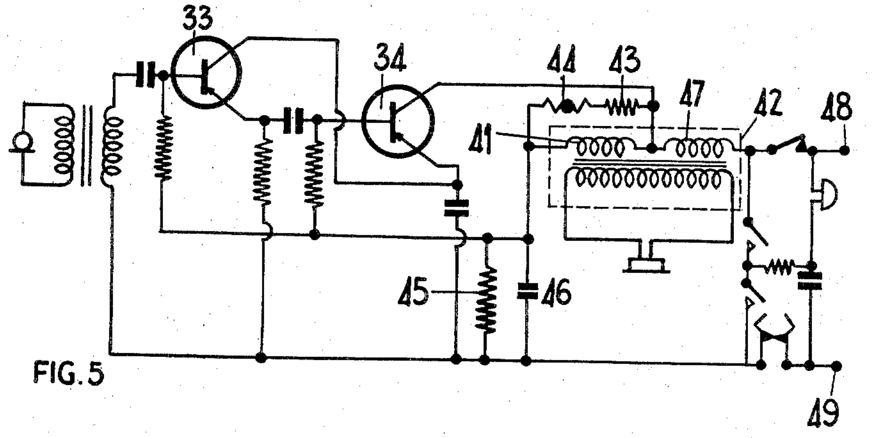

The induction coil 38 and the inductor 35 of this last arrangement may in fact be combined as shown in Figure 5. In this case, the voltage developed across the winding 41 of the induction coil 42 in combination with a resistor 43 and a thermistor 44 constitutes the supply to the transistor amplifier. The induction coil 42 is arranged to operate as an anti-side tone circuit in known manner while the resistor 45 in combination with the capacitor 46 together constitute a network to balance the impedance presented by the line wires connected to the terminals 48 and 49. In order to preserve a similar degree of side tone suppression on short lines as on long lines another thermistor may be connected in series with a resistor across the winding 47 and the induction coil 42, this resistor and thermistor not being shown in the drawing but being similar to the resistor 43 and the thermistor 44.

The direct current resistance of the inductor 35 and winding 41 in the arrangements described above with reference to Figures 4 and 5 may have resistances of say 155 ohms while the resistors 36 and 43 have values of 50 ohms and the thermistors 37 and 44 have the same characteristics as the thermistor 15.

Figure 6:
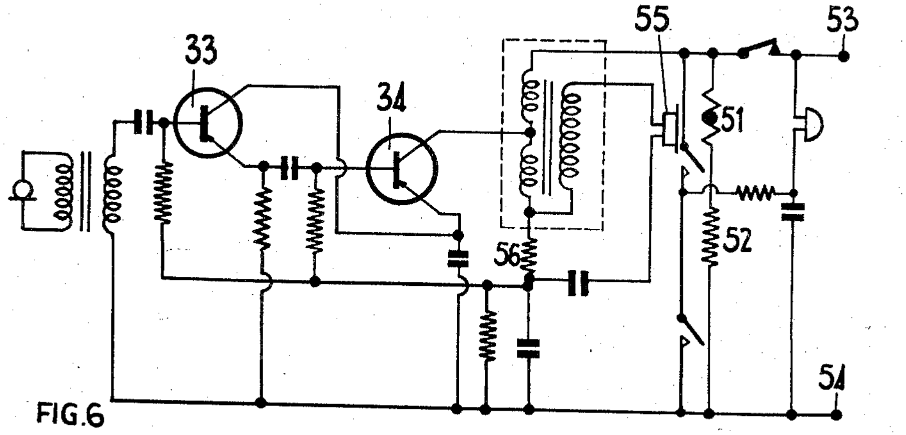

Referring now to Figure 6, the fifth example makes use of the same transistor amplifier circuit as is shown in Figures 4 and 5. In this case all the voltage supplies to the transistor amplifier are regulated so as to be substantially independent of the value of loop line resistance over a range of values thereof. For this purpose a thermistor 51 and a resistor 52 are effectively connected across the terminals 53 and 54. It will be appreciated that the path through this thermistor 51 and resistor 52 provides a shunt path with respect to both speech signals supplied over line wires. There is, therefore, an automatic control of the level of the speech signals in both directions in substantially the manner hereinbefore described with reference to Figure 3 of the accompanying drawings. The apparatus is balanced with respect to side tone by selecting a suitably small value for the resistance of the resistor 56.

The transistor amplifier of each of the five circuits described above by way of example, together with the induction coil and the other components for deriving the electric supplies to the amplifier from the line current, may be located within a common housing. This housing may for example be a housing which is integral with the cradle rest for the hand set and on which the impulsing dial is mounted, if the apparatus is provided with such a dial.

It will be appreciated that the invention is not restricted to p-n-p junction transistors since those of the n-p-n type may alternatively be used. Moreover, it is not essential for two-stage transistor amplifiers to be used. For example a single stage amplifier may be used in combination with a carbon microphone which is arranged to be energised by the line current.

I claim:

1. Telephone apparatus for connection over line wires to a central battery telephone exchange, said apparatus comprising a pair of terminals for connection to line wires, a microphone, a transistor amplifier which is connected in circuit between the microphone and the said pair of terminals, and means for deriving from the line current through the apparatus a voltage which constitutes an electric supply for said transistor amplifier, the said means including an element which has a non-linear resistance, the said means further including circuit means for directing current from the central battery exchange through said element upon the telephone apparatus being connected to the exchange over the line wires, the value of the resistance of the said element depending upon the amplitude of line current and thus of the loop resistance of the line wires so as to tend to stabilize the said voltage over a range of values of loop resistance.

2. Telephone apparatus according to claim 1 wherein the transistor, amplifier includes a transistor of the junction type.

3. Telephone apparatus according to claim 1 wherein the said element is a thermistor.

4. Telephone apparatus according to claim 1 wherein the said voltage deriving means is formed by a network which includes the said element and which is arranged to carry all the line current, the stabilized voltage being developed across the said network.

5. Telephone apparatus according to claim 1 wherein the said means comprises a first direct current path which includes a resistance, a second direct current path which includes the said element and which is connected in parallel relationship with the first path so that there is a division of the line current between the two paths, the said voltage being developed across the said resistance.

6. Telephone apparatus according to claim 5 wherein the said path serves to attenuate speech signals both to and from the apparatus, the arrangement being such that resistance of said element is such that the attenuation is greatest when the apparatus is operatively connected to an exchange over relatively short line wires.

7. Telephone apparatus according to claim 1 wherein the said means is arranged to supply at least two different voltages to the transistor amplifier and each of the voltages supplied thereby is stabilized by the said element.

8. Telephone apparatus according to claim 1 wherein the said transistor amplifier is a two stage amplifier.

9. Telephone apparatus according to claim 8 wherein both stages of the amplifier are grounded base stages.

10. Telephone apparatus according to claim 9 wherein the two stages are transformer coupled.

11. Telephone apparatus according to claim 8 wherein the first stage is a grounded collector stage while the second stage is a ground emitter stage.

12. Telephone apparatus according to claim 11 wherein the two transistors are connected so that the steady emitter current of the second stage is the steady collector current of the first stage.

13. Telephone apparatus for connection over line wires to a central battery telephone exchange, said apparatus comprising a pair of terminals for connection to line wires, a microphone, an induction coil, a transistor amplifier which is connected in circuit between the microphone and the said pair of terminals, a telephone receiver connected to the induction coil, a resistance connected in circuit with the induction coil across the input terminals, a path for feeding the voltage developed across the said resistance due to line current flowing through that resistance to the transistor amplifier as an electric supply for that amplifier, a thermistor, and a direct current path which includes the thermistor and which is connected between the input terminals.

14. Telephone apparatus for connection over line wires to a central battery telephone exchange, said apparatus comprising a pair of terminals for connection to line wires, a microphone, a transistor amplifier which is connected in circuit between the microphone and the said pair of terminals, and means for deriving from the line current through the apparatus a voltage which constitutes an electric supply for said transistor amplifier, the said means including an element which has a high temperature coefficient of resistance, the said means further including circuit means for directing current from the central battery exchange through said element upon the telephone apparatus being connected to the exchange over the line wires, whereby the value of the resistance of the said element will depend upon the amplitude of line current and thus of the loop resistance of the line wires so as to tend to stabilize the said voltage over a range of values of loop resistance.

15. Telephone apparatus for connection over line wires to a central battery telephone exchange, said apparatus comprising a pair of terminals for connection to line wires, a microphone, a transistor amplifier which is connected in circuit between the microphone and the said pair of terminals, and means for deriving from the line current through the apparatus a voltage which constitutes an electric supply for said transistor amplifier, the said means including an element which has a high negative temperature coefficient of resistance, the said means further including circuit means for directing current from the central battery exchange through said element upon the telephone apparatus being connected to the exchange over the line wires, whereby the value of the resistance of the said element will depend upon the amplitude of line current and thus of the loop resistance of the line wires so as to tend to stabilize the said voltage over a range of values of loop resistance.

16. Telephone apparatus for connection over line wires to a central battery telephone exchange, said apparatus comprising a pair of terminals for connection to line wires, a microphone, a transistor amplifier which is connected in circuit between the microphone and the said pair of terminals, and means for deriving from the line current through the apparatus a voltage which constitutes an electric supply for said transistor amplifier, the said means including a network comprising two paths in parallel, the said means further including circuit means to direct current through both of said paths from the central battery exchange upon the apparatus being connected to the exchange over line wires, one of said paths including a first element having a substantially constant resistance, the other of said paths including a second element having a high negative temperature coefficient of resistance, whereby the value of the resistance of the second element will depend upon the amplitude of line current and will vary in the same sense as the loop resistance of the line wires so as to tend to stabilize the voltage developed across the network over a range of values of loop resistance.

References Cited in the file of this patent

UNITED STATES PATENTS

| | | |
|---|---|---|
| 1,655,537 | Foley | Jan. 10, 1928 |
| 2,762,867 | Meacham | Sept. 11, 1956 |